May 15, 1934.　　　　H. CYPRA　　　　1,959,200
ELECTRIC VALVE CONVERTING SYSTEM
Original Filed Sept. 27, 1932
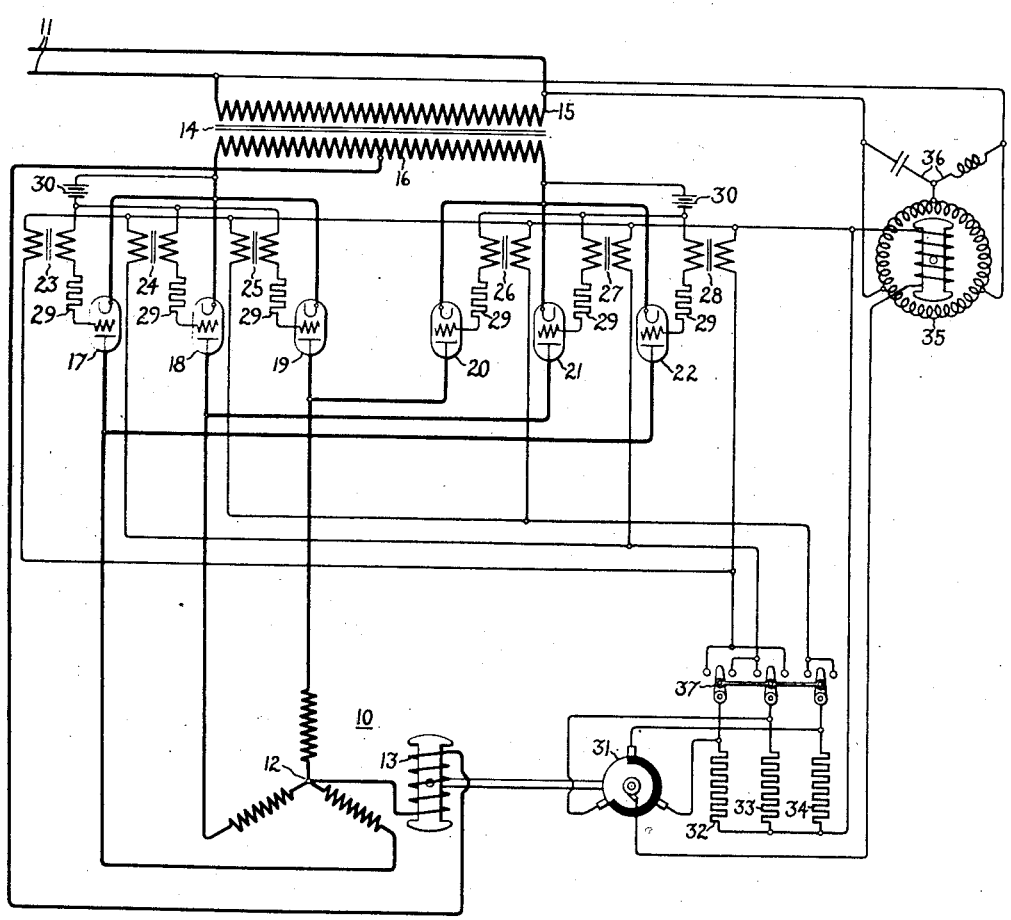
Inventor:
Helmut Cypra,
by Charles E. Mullan
His Attorney.

Patented May 15, 1934

1,959,200

UNITED STATES PATENT OFFICE 1,959,200

ELECTRIC VALVE-CONVERTING SYSTEM

Helmut Cypra, Berlin-Karow, Germany, assignor to General Electric Company, a corporation of New York Application September 27, 1932, Serial No. 635,107
Renewed January 16, 1934. In Germany September 28, 1931

3 Claims. (Cl. 174—274)

My invention relates to electric valve-converting systems and more particularly to such systems including electric valves for transmitting energy from a source of direct or alternating current to a polyphase load circuit.

Heretofore, there have been proposed numerous arrangements including electric valves for transmitting energy from a direct- or alternating-current circuit to a polyphase alternating-current load circuit or motor. It is often desirable to be able to reverse the direction of phase rotation of the load circuit or direction of rotation of the motor, but heretofore there have been devised no satisfactory arrangements for securing this result.

It is an object of my invention, therefore, to provide an improved electric valve-converting system for transmitting energy from a direct- or alternating-current supply circuit to a polyphase load circuit in which the direction of phase rotation may be readily reversed.

In accordance with one embodiment of my invention a polyphase alternating-current motor having a star connected armature winding is connected for half-wave operation from a source of single-phase alternating current through a plurality of electric valves interconnecting each of the phase windings of the motor with each of the terminals of the supply circuit, all of the valves being connected similarly with respect to the armature phase winding. The alternating-current source is provided with an electrical neutral, as for example by means of a transformer and this neutral is interconnected with a neutral of the armature winding through an excitation winding for the alternating-current motor. In order to control the conductivity of the several electric valves, there is provided means for deriving from said source an alternating potential variable in phase and this alternating potential is impressed upon the grids of the several electric valves through a distributor mounted on the shaft of the motor and so adjusted that excitation is supplied to the grids of the valves associated with the particular motor armature phase which is in torque producing position with respect to the excitation winding. By properly varying the phase of the grid excitation, the energization of the motor, and hence its speed, may be varied as desired. A transposing switch is interposed in the connections between the distrbutor and the grids of the several electric valves in order that the sequence in which the several valves are excited may be varied to reverse the rotation of the motor.

For a better understanding of my invention, together with other and further objects thereof, reference is had to the following description taken in connection with the accompanying drawing and its scope will be pointed out in the appended claims. The single figure of the drawing illustrates an arrangement embodying my invention for energizing a three-phase alternating current motor of the synchronous type for half-wave operation from a source of single-phase alternating current.

Referring now to the drawing, there is illustrated an arrangement for operating an alternating-current motor 10 from a single-phase alternating-current supply circuit 11. The motor 10 may be of the induction or synchronous type, although the latter type is illustrated, and comprises a three-phase star-connected armature winding 12 and a rotatable field or exciting winding 13. The armature winding 12 is connected to be energized from the alternating-current supply circuit 11 through a transformer 14 comprising a primary winding 15 connected to the circuit 11 and a secondary winding 16 provided with an electrical midpoint. The several terminals of the armature winding 12 are connected to one side of the winding 16 through electric valves 17, 18 and 19 and to the other side of the winding 16 through electric valves 20, 21 and 22, while the electrical neutral of the winding 16 is connected with a neutral of the armature winding 12 through the exciting winding 13, or, in case the motor 10 is of the induction type, this winding may be omitted or may comprise a separate reactance external to the motor 10. The electric valves 17–22, inclusive, are each provided with an anode, a cathode and a control grid and may be of any of the several types well known in the art although I prefer to use valves of the vapor electric discharge type.

In order to control the several electric valves to supply unidirectional current successively to the several phase windings of the motor armature 12, the grids of the several electric valves 17–22, inclusive, are excited from the secondary windings of their associated grid transformers 23–28, inclusive, respectively, through current-limiting resistors 29 and negative bias batteries 30. The primary windings of the grid transformers 23–28, inclusive, are energized from the alternating-current circuit 11 through a distributor 31 directly connected to the motor rotor. In order to provide a stiff grid circuit, the primary windings of the several transformers may be energized with potentials across the resistors 32, 33 and 34, which are successively energized through the brushes of the distributor 31 from the alternating-current circuit 11. In case it is desired to control the average voltage impressed upon the motor 10 for starting or for speed regulation, there may be provided means interposed between the circuit 11 and the distributor 31 for shifting the phase of the alternating potential applied to the resistors 32, 33 and 34. By way of example, I have illustrated a rotary phase-shifting transformer 35 energized from the circuit 11 through a well-known phase-splitting circuit 36. In order to reverse rotation of the motor 10, that is, to reverse the sequence with which the phase windings to the armature 12 are excited, there is included a transposing switch 37 between the distributor 31 and the primary windings of the several grid transformers. For the three-phase motor illustrated, it is necessary to transpose only the grid connections of two phases as illustrated, while in the general case of polyphase load circuits of $n$ phases it will be necessary to transpose $n-1$ grid circuits.

In explaining the operation of the above-described apparatus it will be assumed that the alternating-current circuit 11 is energized at any desired frequency, preferably a commercial frequency, that the rotary phase-shifting transformer 35 is adjusted so that the alternating potential impressed upon the several grid circuits is retarded substantially with respect to that of the circuit 11, that the switch 37 is in its left-hand position and that the rotary field winding 13 and distributor 31 are in approximately the positions illustrated. Under these conditions, it will be seen that the primary windings of the grid transformers 24 and 27 are energized with potentials across the resistor 33 and the associated valves 18 and 21, together with the transformer 14, act as a rectifier to supply unidirectional current to the exciting winding 13 and the lower left-hand phase winding of the armature 12. At the same time the grid circuits of the other electric valves are deenergized, except for the negative bias batteries 30, so that these valves will be maintained nonconductive. The phase winding of the armature 12 which is excited as described above, is in torque producing position with respect to the exciting winding 13 and the motor begins to rotate and accelerate. Under starting conditions substantially zero counter-electromotive force is induced in the armature winding 12 of the motor 10, but as stated above, by proper adjustment of the rotary phase-shifting transformer 35 the average voltage impressed upon the motor 10 may be reduced to a safe value, as is well understood by those skilled in the art. When the motor has rotated through substantially 120 electrical degrees, the distributor 31 is effective to deenergize the transformers 24 and 27 and energize the transformers 23 and 28 to render the valves 17 and 22 conductive to supply unidirectional current to the lower right hand phase winding of the armature 12 and the exciting winding 13. In this manner the current is successively commutated between the several phase windings of the armature 12 in such a way that, at any particular instant, only that particular phase winding is energized which is in a torque-producing position with respect to the motor rotor. As the motor gains speed, the exciting winding 13 will induce a counter-electromotive force in the armature 12 tending to reduce the input of the motor and establish a state of equilibrium. By properly advancing the phase-shifting transformer 32, however, the energization of the motor 10 may be increased to increase the speed of the motor 10 as desired.

In case it is desired to reverse the direction of rotation of the motor 10, the switch 37 may be operated to its right-hand position. Due to the fact that very little energy flows in the control circuit including the grid transformers 23-28, inclusive, the switch 37 need be of very low rating, even though it is desired to reverse the operation of the motor under considerable load. With the switch 37 in its right-hand position, it will be noted that transformers 23 and 28 are initially energized, in the position of the distributor 31 illustrated, so that unidirectional current will be supplied to the lower right-hand phase winding of the armature 12 and the exciting winding or rotor 13 will begin to rotate in the opposite direction. Thereafter the current will be commutated between the several phase windings in a manner similar to that described above.

While I have described what I at present consider the preferred embodiment of my invention, it will be obvious to those skilled in the art that various changes and modifications may be made without departing from my invention, and I aim in the appended claims to cover all such changes and modifications as fall within the true spirit and scope of my invention.

What I claim as new and desire to secure by Letters Patent of the United States, is:

1. An electric valve-converting system comprising a source of current, a polyphase load circuit provided with a plurality of phase terminals, a plurality of valves interconnecting said source and said terminals for commutating the current therebetween, each of said valves being provided with a control grid, means for exciting said grids in a predetermined sequence, and means for reversing the phase rotation of said load circuit comprising means for changing the sequence of excitation of said valves.

2. An electric valve-converting system comprising a source of current, an $n$-phase polyphase motor provided with $n$ phase terminals, $n$ valves interconnecting said source and said terminals for commutating the current therebetween, each of said valves being provided with a control grid, means for exciting said grids in a predetermined sequence, and means for reversing the rotation of said motor comprising means for changing the connection of ($n-1$) of said grid circuits.

3. An electric valve-converting system comprising a source of current, a polyphase motor provided with a plurality of phase terminals, a plurality of electric valves interconnecting said source and said terminals for commutating the current therebetween, each of said valves being provided with a control grid, a source of grid potential, a distributor driven by said motor to excite said grids in a predetermined sequence, and switching means for changing the connections of said grid circuits to reverse the direction of rotation of said motor.

HELMUT CYPRA.